United States Patent [19]

Sinks et al.

[11] Patent Number: 5,206,935
[45] Date of Patent: Apr. 27, 1993

[54] APPARATUS AND METHOD FOR FAST I/O DATA TRANSFER IN AN INTELLIGENT CELL

[76] Inventors: Rod G. Sinks, 10316 Denison Ave., Cupertino, Calif. 95014; Robert W. Donner, 2580 Bean Creek Rd., Scotts Valley, Calif. 95066

[21] Appl. No.: 675,448

[22] Filed: Mar. 26, 1991

[51] Int. Cl.[5] .............................................. G06F 13/00
[52] U.S. Cl. ................................................... 395/275
[58] Field of Search ............................... 395/325, 275

[56] References Cited

U.S. PATENT DOCUMENTS

| | | | |
|---|---|---|---|
| 3,970,999 | 7/1976 | Elward | 395/400 |
| 4,204,250 | 5/1980 | Getson, Jr. et al. | 395/425 |
| 4,374,733 | 7/1983 | Swanson | 395/425 |
| 4,379,328 | 4/1983 | Catiller et al. | 395/275 |
| 4,399,503 | 8/1983 | Hawliey | 395/325 |
| 4,419,728 | 12/1983 | Lanson | 395/325 |
| 4,511,960 | 4/1985 | Boudreau | 395/550 |
| 4,604,695 | 8/1986 | Widen et al. | 305/400 |
| 4,792,891 | 12/1988 | Baba | 395/325 |
| 4,947,484 | 11/1990 | McCarthy et al. | 395/325 |
| 4,837,677 | 6/1989 | Burrus, Jr. et al. | 395/325 |
| 4,912,631 | 9/1990 | Lloyd | 395/425 |
| 4,947,484 | 11/1988 | Twitty et al. | 371/37.106 |
| 4,975,869 | 12/1990 | Ammann et al. | 395/575 |
| 5,091,846 | 2/1992 | Sachs et al. | 395/250 |

*Primary Examiner*—Robert L. Richardson

[57] ABSTRACT

A specialized apparatus and method for providing fast programmed I/O for transferring information in a multi-processor environment which includes a CPU, and a memory coupled to an I/O port across an internal data bus. Multiple bytes of data are transferred in successive processing cycles to the I/O port from the memory, or from the I/O to the memory by first determining the upper limit for the number of bytes that are going to be transferred. This number and the memory start address are then stored in CPU registers. The I/O module is then checked by the CPU to see if a data byte is available from an external device. If a data byte is available, the I/O module is instructed to place the data byte on the bus for storage within the memory at the start address. The address is then incremented and the count is decremented. The above procedure is repeated until the count drops to zero, after which time the next instruction is fetched.

11 Claims, 3 Drawing Sheets

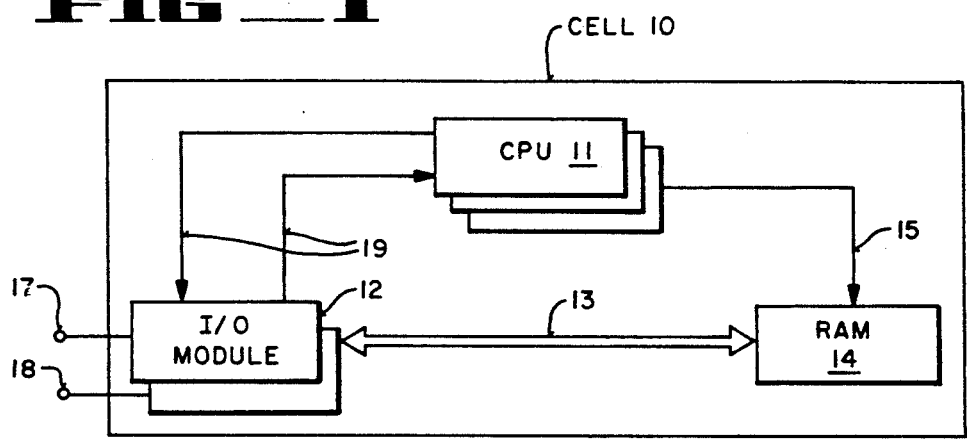
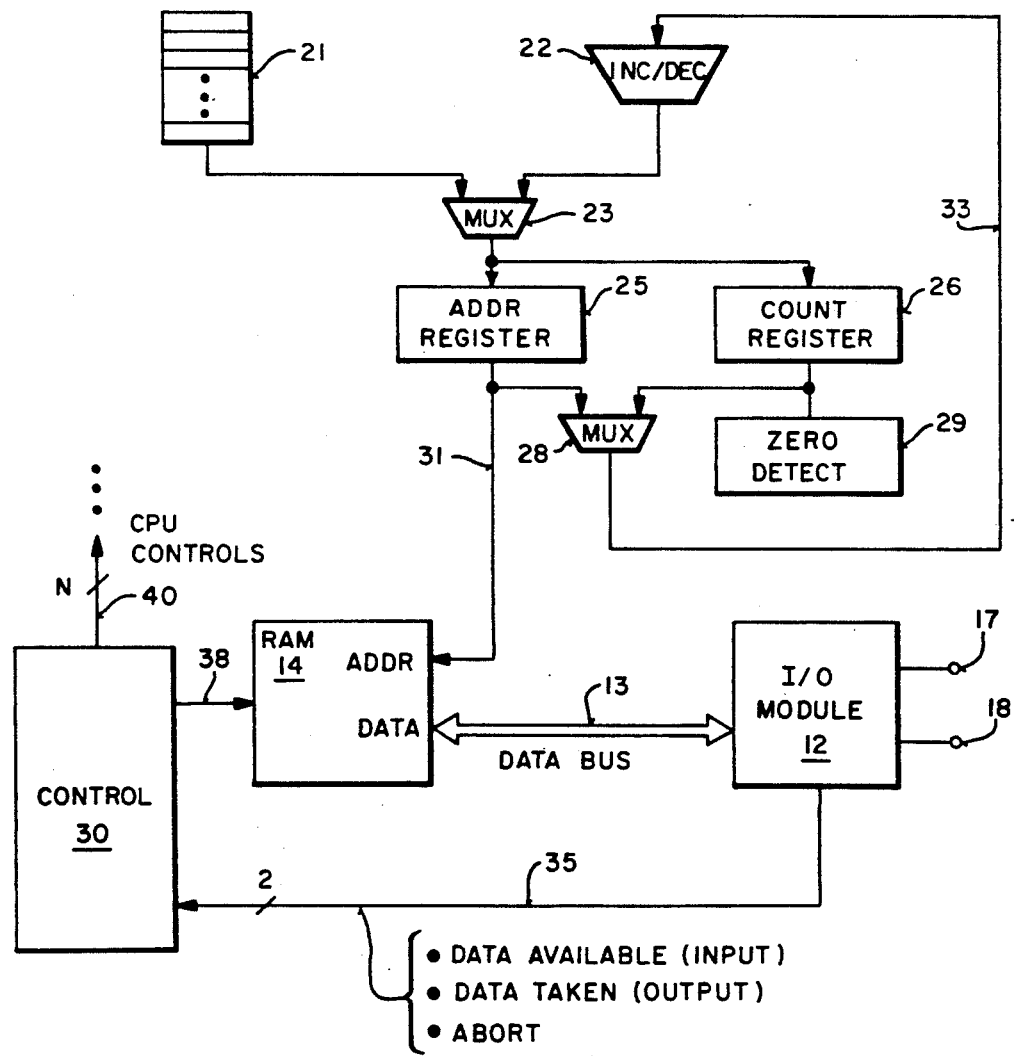

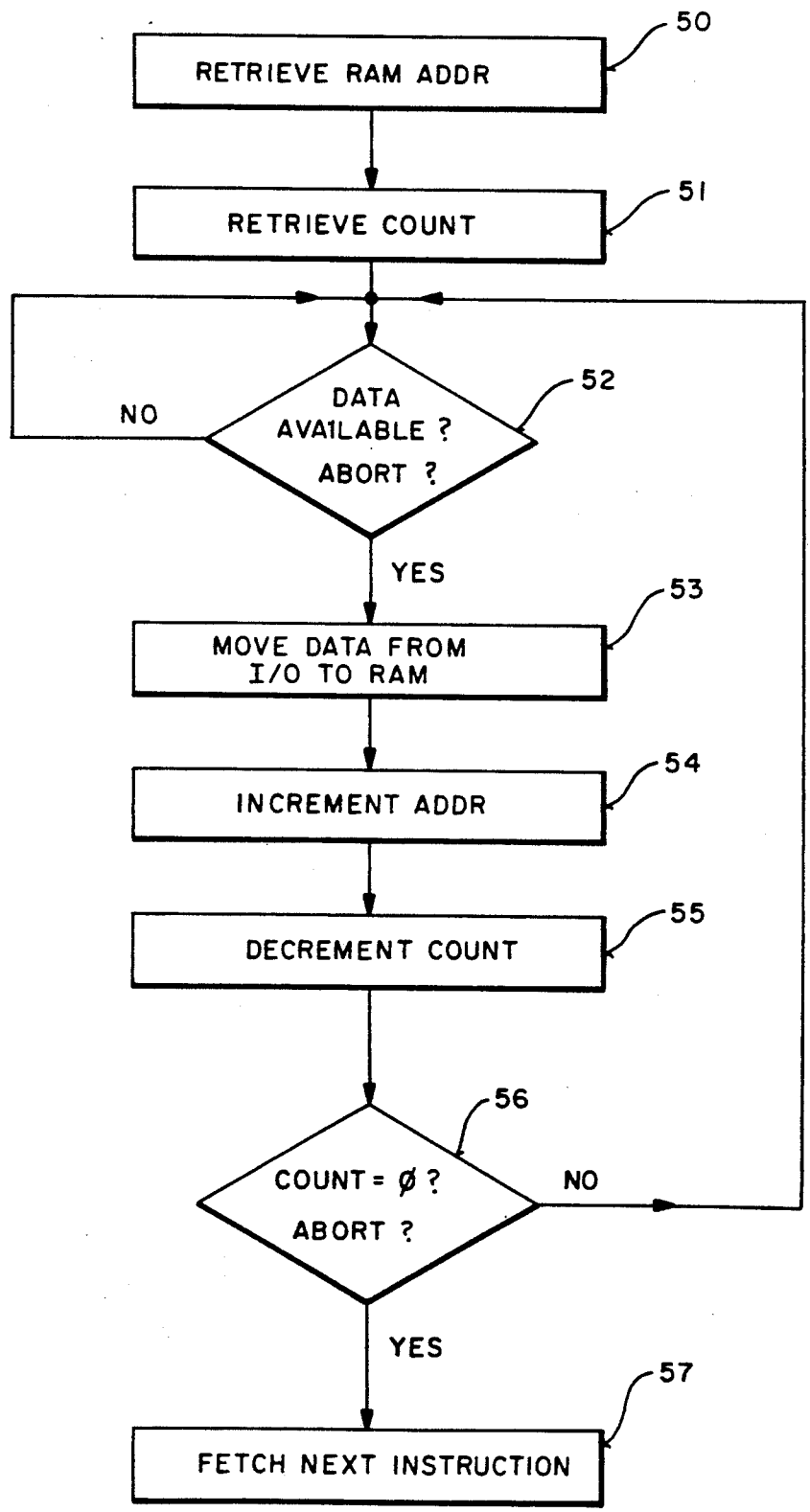
FIG_3 FAST I/O IN

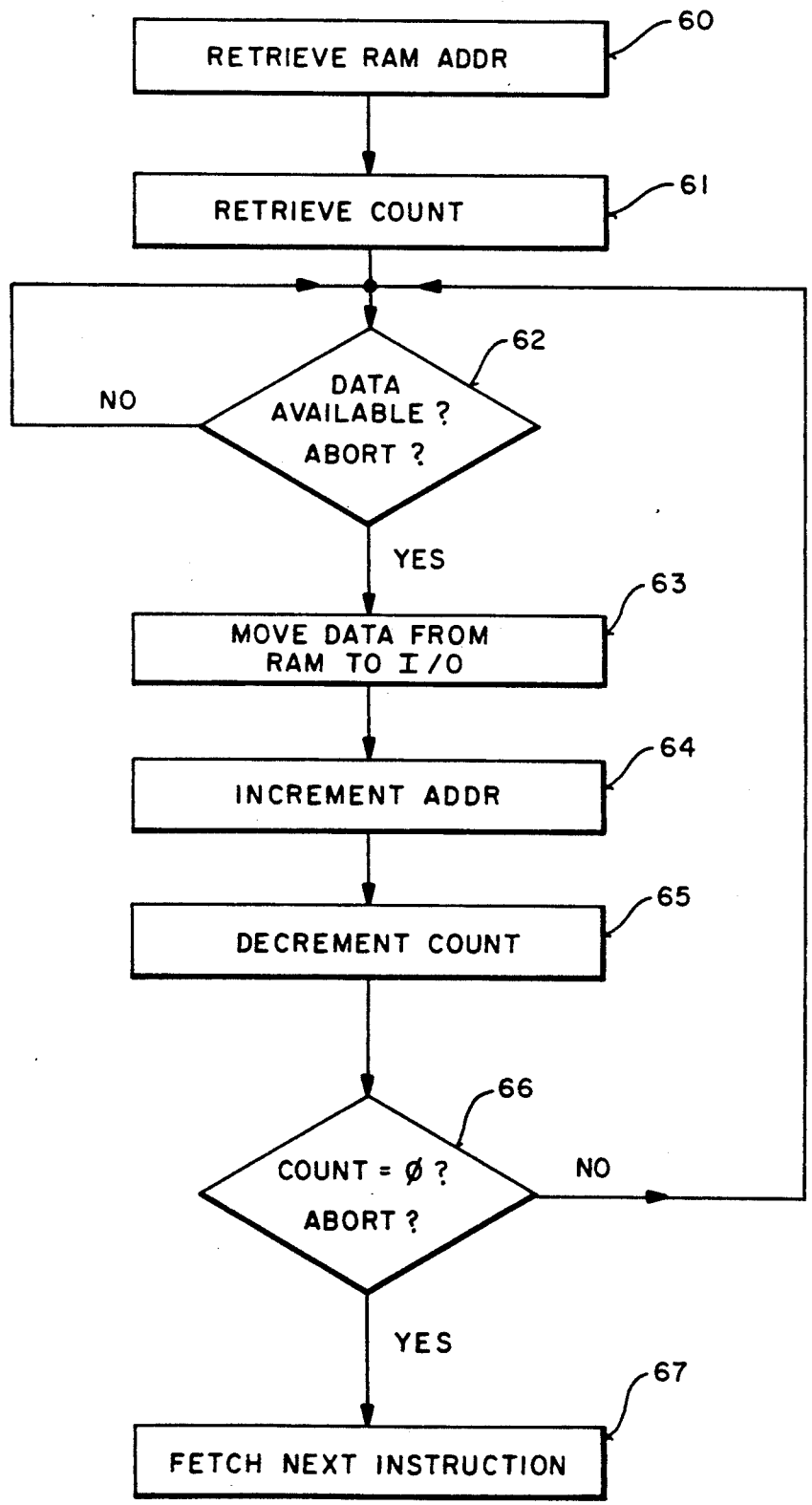
FIG_4  FAST I/O OUT

APPARATUS AND METHOD FOR FAST I/O DATA TRANSFER IN AN INTELLIGENT CELL

FIELD OF THE INVENTION

The invention relates to the field of data transfer in a microprocessor; particularly in the case where a multi-processor is employed within an intelligent cell used in a network for sensing, communicating and controlling.

BACKGROUND OF THE INVENTION

There are a number of commercially available products which provide sensing, controlled and communications in a network environment. These products range from elaborate systems having a large amount of intelligence to simple systems having little intelligence. By way of example, such a system may provide control between a light switch and a light; when the light switch is operated, a digital code pattern is transmitted by one cell over power lines or free space and is received by another cell at the light. When the code is received, it is interpreted and subsequently used to control the light.

Such a system—comprising a network of intelligent cells in which the cells communicate, control and sense information—is described in U.S. Pat. No. 4,947,484, which application is assigned to the assignee of the present invention. FIG. 10 of U.S. Pat. No. 4,947,484 illustrates a block diagram of an intelligent cell capable of communicating, controlling and sensing information. As can be seen, such cells typically comprise a plurality of processors coupling an internal memory to an input/output (I/O) block across address and data buses. The memory portion of the intelligent cell may include a ROM for storing instructions, a RAM for buffer storage, and an EEPROM for holding configurable information or other information that needs to be retained in a non-volatile way. The I/O block includes a communications port having many functions programmed for various communications tasks. Observe that the intelligent cell of FIG. 10 further includes a clocking means and associated timing control elements.

Practically all processors require some means of transferring information either from an internal memory to an external communications port, or vis-a-versa. For example, in the processing system described in the above-referenced U.S. patent, a plurality of intelligent cells are shown being distributed along a network. These cells exchange information over some communications backbone, such as a transceiver. Individual cells each contain a multi-processor composed of several microprocessors. In a distributed intelligence environment such as this, where there exists a need to control or sense things remotely, cells are serviced by a communication port that allows each of the intelligent computers to communicate with all of the other intelligent computers over a variety of media.

Within this type of distributed environment, there may be certain applications for which the processing power inside individual cells may be inadequate. For instance, if a cell were given the task of controlling a factory floor and the algorithm used for calculating the control information were very compute-intensive (e.g., there were extensive multiplication or division calculations required) then there may also be a need to communicate between the intelligent cell and a high-speed industrial computer, e.g., a main frame computer capable of floating point operations. In such a situation, data transfer and communications within the cell takes place over a general purpose I/O bus coupled to an external port of the cell.

It is important to understand that the level of performance achieved in transferring information to/from a particular cell may not be governed by how fast the individual microprocessors perform within the cell, but by how fast the address and data pipelines (i.e., buses) operate between the memory and a communications port or between memory and an I/O port.

One traditional mechanism for communicating with memory is known as programmed I/O. According to the programmed I/O scheme, information is transferred a single byte at a time. For every byte of information to be transferred, the processor must execute an implicit instruction which, in the case of a data transfer out, first involves fetching a byte from a certain location within the RAM, then transferring it through the central processing unit (CPU) and then out to the communications port.

In other words, all processing is done on a byte-by-byte basis. In a given transfer (either into or out of the processing system), only a single byte is transferred for each cycle. In order to transfer multiple bytes (e.g., 256 bytes) in a programmed I/O scheme, single byte data must be repetitively moved from a location in RAM to the CPU, then from the CPU to the communications port. Each move requires execution of a separate processor instruction. Understandably, the primary drawbacks of programmed I/O are its extreme slowness and the burden it places on the CPU for transferring each byte.

In response to the relative slowness of programmed I/O, a mechanism referred to in the industry as direct-memory-access (DMA) was developed. DMA remains a popular way of transferring data between a memory and an I/O or communications port in a computer system which demands fast data transferring capability.

According to DMA, specialized controller circuitry is incorporated into both the memory and communications ports to allow each unit to directly seize control of the internal buses to access memory directly. As a result, DMA is an especially fast method of transferring data, particularly in a shared-memory architecture employing shared I/O buses.

The main problem with the DMA approach is that it involves a great deal of complexity. That is, there is a large amount of circuitry overhead associated with DMA for each of the participants. When implemented on an integrated circuit, one must realize that the superior performance of DMA comes at the expense of die area.

The reason for this is because a separate set of DMA hardware needs to be built into the communications port and each of the I/O blocks coupled to the internal data bus. DMA hardware normally comprises a state machine to seize control of the bus at precisely the right moment, and also some arbitration logic to insure that during DMA operations the microprocessor does not create a bus ownership conflict. Thus, while DMA offers a substantial increase in speed, this performance increase comes at the cost of a large hardware overhead.

The speed difference between DMA approaches and programmed I/O creates a dilemma for many intelligent cells of the type described which currently need to operate their communications and I/O ports at rates of approximately 1 Mbit/sec. In a typical cell of the type described, programmed I/O is approximately four times too slow to support the required communication rate, whereas direct memory access logic is at least an order of magnitude faster than needed. Recall the DMA circuitry generally requires a substantial increase in DMA-dedicated silicon area. (Buses and many other various signal must be brought together to accommodate DMA which requires a significant increase in routing area). In effect, DMA provides more performance than is needed at considerable additional cost.

Thus, there exists an unrequited need for an alternative to both programmed I/O and DMA, which operates at an intermediate data transfer rate.

SUMMARY OF THE INVENTION

A specialized apparatus and method for providing fast programmed I/O for transferring information in a multi-processor environment is described. The invented apparatus and method is embodied in a processor instruction which facilitates high speed data transfer.

In one embodiment, an intelligent cell or processing element includes a CPU, a memory, and an I/O port. The memory is coupled to the I/O port across an internal data bus. According to the fast I/O instruction of the present invention, multiple bytes are transferred in one processing cycle to the I/O port from the memory, or from the I/O to the memory.

In accordance with the preferred embodiment, the upper limit for the number of bytes that are going to be transferred is first determined. This number is placed in the top of an 8-byte stack register. In the next instruction cycle, the number of bytes indicated in the top of stack are transferred out without the need to go through explicit instruction fetches for each byte (which involves multiple memory operations).

One of the beneficial features of the present invention is that it takes advantage of the existing hardware within the central processing unit (CPU). This latter point is important since by avoiding the need for additional control hardware, the present invention overcomes the drawbacks characteristic of conventional prior art approaches (e.g., direct memory access mechanisms). Thus, the invention is able to implement data transfers at a rate which is approximately five times faster than traditional programmed I/O—yet without the hardware overhead inherent with a DMA scheme. Ultimately, this reduces the overall die size and simplifies the design.

BRIEF DESCRIPTION OF THE DRAWINGS

FIG. 1 is a generalized block diagram of an intelligent cell for communication, control, and sensing.

FIG. 2 is a block diagram of the currently preferred embodiment of the fast input/output (I/O) instruction of the present invention.

FIG. 3 is a flowchart depicting the sequence of control operations executed during a fast I/O instruction, wherein information is transferred into an intelligent cell.

FIG. 4 is a flowchart depicting the sequence of control operations executed during a fast I/O instruction, wherein information is transferred out of an intelligent cell.

DESCRIPTION OF THE PREFERRED EMBODIMENT(S)

An apparatus and method for achieving fast programmed I/O in a computer system is described. While the present invention will be described in conjunction with a network providing communications, sensing and control through a plurality of intelligent cells, it is appreciated that the present invention may be practiced in other applications without detracting from the spirit and scope of the present invention.

In the following description, numerous specific details are set forth such as specific number of bytes, etc., in order to provide a thorough understanding of the invention. It will be obvious, however, to one skilled in the art that these details are not required to practice the invention. In other instances, well-known circuits, methods and the like are not set forth in detail in order to avoid unnecessarily obscuring the present invention.

In FIG. 1, a block diagram of an intelligent cell 10 is shown. Cell 10 is one of a plurality of cells in a system comprising a network organized in a hierarchy based on communications needs. Cells are organized into working "groups" independent of the network hierarchy. Groups of cells generally are used to perform a group function by the assignment of tasks to cells within the groups. Cells communicate, control and sense information. In general, each cell has a unique identification number and performs information processing tasks such as: Bi-directional communications protocol, input/output, packet processing and analog/digital sensing and control. In general, the system comprised of the cells has the characteristic of storing network configuring information that is distributed throughout the system. The system also communicates automatically routed messages among the cells.

In FIG. 1, cell 10 includes multiple central processing units (CPUs) 11 or some similar multi-processor. Also included are input/output (I/O) modules 12 which, by way of example, are shown providing a communications port 17 together with an application I/O port 18, frequently referred to simply as an I/O port. Also shown is a random-access memory (RAM) 14 coupled to I/O modules 12 across an internal data bus 13.

CPU 11 provides control signals to, and receives responses from, I/O modules 12 along lines 19. Likewise, CPU 11 provides control signals to RAM 14 along lines 15.

In the currently preferred embodiment, the multi-processor of cell 10, 11 comprises three processing units 11. Any of the three processors can utilize the fast I/O instruction of the present invention to transfer data to/from RAM 14 and I/O modules 12 across bus 13. RAM 14 ordinarily comprises a plurality of static memory cells, although dynamic cells can also be used. In other embodiments, the memory section of cell 10 may further include non-volatile data storage, and/or a read-only memory (ROM) for storing instruction codes. As previously mentioned, the fast I/O instruction of the present invention permits transfers of multiple bytes of data—either into or out of cell 10—by invoking a single processor instruction.

The present invention is actually embodied in two separate processor instructions. First, the "Fast I/O IN" instruction automatically moves data from an I/O module into the on-chip RAM. Conversely, the "Fast I/O OUT" instruction automatically exports data from the on-chip RAM to one of the I/O modules, where it can then be ported or transferred to another cell or computer system.

Referring to FIG. 2, a low level block diagram of the apparatus for implementing the instruction of the present invention is shown. In the currently preferred embodiment, the block diagram of FIG. 2 comprises the use of CMOS technology wherein the present invention is incorporated into cell 10 of FIG. 1, and fabricated as a single integrated circuit. Except for RAM 14, data bus 13 and I/O modules 12, each of the devices illustrated in FIG. 2 comprise existing hardware elements normally integrated within CPU 11.

Before a fast I/O instruction may be executed, the CPU and the selected I/O module must first be prepared. To start, the I/O module is programmed by the CPU to initiate a data transfer to/from a device that is external to the cell. The I/O module is also prepared for data transfer to/from the CPU. Next, the RAM start address and the transfer count are pushed onto a stack 21. The transfer count represents the total number of bytes which will be transferred by a single processor instruction. In the currently preferred embodiment, up to 256 bytes may be transferred in one instruction cycle.

It is appreciated that stack 21 may be substituted with various other register means in different architectures. By way of example, an ordinary register file could be substituted for stack 21, or the CPU might place the address and count information in appropriate registers before executing a fast I/O instruction. Thus there exist a variety of methods for performing the set-up portion of the fast I/O instruction. Each of these means or methods is considered well within the spirit and scope of the present invention.

Each of the "Fast I/O IN" and "Fast I/O OUT" instructions of the present invention can be divided into two separate functions: Set-up and execution. During the set-up portion of a fast I/O instruction, the RAM start address is retrieved from stack 21 and moved to a CPU address register 25 via multiplexer 23. The transfer count is also moved from stack 21 and placed in a CPU count register 26; the transfer also occurring through multiplexer 23. The set-up portion of a fast I/O instruction is now complete. (Note that in FIG. 2, the respective device elements, such as stack 21, MUXs 23, 28, etc., are shown being controlled by CPU control logic block 30. The individual control lines are represented by lines 40).

The execution portion of a Fast I/O IN instruction begins with CPU control block 30 checking the status of I/O handshaking bus 35. This line indicates whether data is presently available. More generally, bus 35 indicates the status of three separate events; Data Available (for an input event), Data Taken (for an output event), or an Abort situation. If data is currently unavailable from I/O module 12, the CPU continues to check for an active "Data Available" signal on handshaking bus 35 on every clock cycle associated with the CPU that is executing the FAST I/O IN instruction. In other words, the CPU enters a wait state until information arrives from its external source.

When handshaking bus 35 is finally activated, the CPU then instructs I/O module 12 to place the available data to be transferred onto data bus 13. At this point, the data is stored at the appropriate address location of RAM 14 indicated by the address currently stored within register 25. The start address location for data to be stored within RAM 14 is provided by register 25 along line 31. It should be understood that during the time that the CPU is waiting for bus 35 to be activated, the CPU will exit this wait state in the event that the I/O module "Abort" handshaking signal is activated for whatever reason.

Regardless of which condition resulted in the CPU proceeding to the next state, the present address stored within register 25 is passed through multiplexer 28 to incrementer/decrementer 22 along line 33. Device 22 increments the previous address to point to the next address location. This next address location then passes through multiplexer 23 to be stored in register 25, thereby replacing the previously stored RAM address. The present count from count register 26 is then passed through multiplexer 28 to be decremented by device 22. The decremented count is then stored back into count register 26.

Following these steps a check is performed for two conditions. If the count stored within register 26 is decremented to zero, or the I/O "Fast I/O Abort" handshake bus 35 is active, the fast I/O instruction will terminate and the next instruction will be fetched. If neither condition is true, data transfer continues and the CPU returns to its wait state until an active "Data Available" (or "Abort") signal appears on bus 35. Note that zero detect block 29 detects when the count stored within register 26 has decremented to zero. This indicates that the multiple byte data transfer has been completed.

Data transfer according to the Fast I/O OUT instruction takes place in the same manner as described above, except that data is transferred from RAM 14 to I/O module 12 along data bus 13, instead of from I/O module 12 to RAM 14. From there the data is exported to an external device. As the external device takes the data at either of ports 17 or 18, a "Data Taken" signal is sent on bus 35 to CPU control block 30. This initiates the increment/decrement process as described above. (Note that in the currently preferred embodiment, the communication port hardware is responsible for sending out bit synchronization, byte synchronization, CRC and end-of-message signals.)

FIG. 3 is a flow chart describing the sequence of events which takes place during the execution of a Fast I/O IN instruction. At block 50, the RAM start address is first retrieved from stack 21. The count is then retrieved from the stack as indicated by block 51. The RAM address and count are placed in registers 25 and 26, respectively (see FIG. 2).

At decision block 52 the CPU checks handshaking bus 35 to see whether data is currently available at the I/O modules. At this point if data is unavailable, the CPU enters a wait state until the "Data Available" or "Abort" signals are received.

Assuming that data becomes available, the data is moved from I/O modules 12 to RAM 14 along internal data bus 13. This occurrence is indicated by block 53. Once the data has been written into RAM 14, the RAM address location is incremented and the count is decremented. These events are shown taking place at blocks 54 and 55, respectively. The new address and count are then stored in registers 25 and 26 as previously explained.

At decision block 56 the count is checked to see whether it has decremented to zero (or an "Abort" signal is activated). If the answer is yes, the sequence moves to block 57, wherein the next instruction is fetched. However, if the count is not zero (i.e., additional bytes are yet to be transferred) the flow returns to decision block 52, wherein the CPU waits for the next byte to arrive.

The sequence of events for a Fast I/O OUT instruction is essentially the same as that for a Fast I/O IN instruction. These events are depicted by the flow diagram of FIG. 4. Basically, blocks 60 through 67 are the same as corresponding blocks 50 through 57 of FIG. 3. The only difference is at block 63, wherein data is moved from the RAM to the I/O modules, rather than from the I/O modules to RAM 14.

Whereas many alternations and modifications of the present invention will no doubt become apparent to a person of ordinary skill in the art after having read the foregoing description, it is to be understood that the particular embodiment shown and described by way of illustration is in no way intended to be considered limiting. For example, although this disclosure has shown a particular way of implementing a fast I/O instruction in the context of a plurality of intelligent cells, other implementations and/or applications are possible.

Every computer or microprocessor-based device must deal with the problem of performing I/O operations. Therefore, reference to the details of the preferred embodiment are not intended to limit the scope of the claims which themselves recite only those features regarded as essential for the invention.

We claim:

1. In a computer system which comprises a memory, at least one input/output (I/O) module, a bus coupling said memory to said I/O module, and a central processing unit (CPU) having a processor executable instruction for transferring multiple bytes of data to said memory from said I/O module across said bus, wherein execution of said instruction causes said CPU to transfer said multiple bytes of data, said CPU comprising:
   register means for storing a current address location for data to be stored within said memory and a current count of a number of bytes of data yet to be transferred to said memory across said bus;
   control means for successively transferring an available byte of data from said I/O module onto said internal bus for storage in said memory at said current address location, said control means issuing a control signal following each said transfer;
   means responsive to said control signal for incrementing said current address and decrementing said current count, wherein the incremented address is stored in said register means as said current address and said decremented count is stored in said register means as said current count prior to a transferal of a next available byte of data;
   means coupled to said control means for terminating said transferal whenever said count equals a predetermined number.

2. The apparatus of claim 1 wherein said CPU control means further comprises handshaking means for communicating the availability of data bytes from said I/O module to said CPU.

3. The apparatus of claim 2, wherein said handshaking means further communicates an end of transfer condition wherein said transfer is immediately terminated and a next instruction is fetched.

4. The apparatus of claim 1 wherein said register means comprises and address register for storing said current address and a count register for storing said current count.

5. The apparatus of claim 4 wherein said memory comprises a random-access memory (RAM).

6. In a network including a plurality of intelligent cells, each cell comprising a central processing unit and a random-access memory (RAM), said RAM being coupled to an input/output (I/O) module across an internal bus, a method of transferring multiple bytes of data to said memory from said module across said internal bus, said method executed by said CPU and comprising the steps of:
   (a) programming said I/O module to initiate a data transfer from an external device;
   (b) storing a current RAM address into a first register and a current count, representing the remaining number of bytes to be transferred across said internal bus, into a second register;
   (c) checking said I/O module to determine if a data byte is available from said external device, if said data byte is available, said CPU instructing said I/O module to place said data byte on said internal bus for storage within said RAM at said current RAM address, if said data byte is unavailable, said CPU waiting until said data byte is available;
   (d) incrementing said current RAM address and storing the incremented address back in said first register;
   (e) decrementing said current count and storing the decremented count back in said second register;
   (f) determining whether said current count equals a predetermined number:
   (g) repeating steps (c)–(f) until said count equals said predetermined number.

7. The method of claim 6 further comprising the step of:
   halting said data transfer in the event an abort signal is received from said I/O module; and
   fetching the next instruction.

8. An apparatus having a central processing unit (CPU), a random-access memory (RAM) and an input/output (I/O) means for exchanging information between said processor and an external device, said I/O means being coupled to said RAM across an internal bus, a processor executable instruction for instructing said CPU to transfer multiple bytes of data between said RAM and said I/O means, wherein said instruction involves a plurality of clock cycles for said CPU to complete said transfer before a following instruction is to be executed by said CPU, comprising:
   register means of storing a current address location for data to be transferred from/to said RAM to/from said I/O means, said register means also storing the current count of the number of data bytes yet to be transferred across said internal bus;
   control means operative within said CPU for successively transferring an available byte of data to/from said I/O means from/to said current address location in said RAM via said internal bus, said control means providing a signal following each transfer;
   logic means operative within said CPU for responding to said signal by incrementing said current address and decrementing said current count, wherein the incremented address and decremented count are stored in said register means as said current address and said current count, respectively, prior to the transfer of the next available byte of data, said logic means including a means for terminating said transfer whenever said current count equals a predetermined number.

9. The instruction of claim 8, wherein said control means further comprises handshaking means for communicating the availability of data bytes from said I/O module to said CPU.

10. The instruction of claim 9, wherein said handshaking means further communicates an end of transfer condition, wherein said transfer is immediately terminated and the next instruction is fetched.

11. The instruction of claim 10, wherein said register means comprises an address register for storing said current address and a count register for storing said current count.

* * * * *

UNITED STATES PATENT AND TRADEMARK OFFICE
CERTIFICATE OF CORRECTION

PATENT NO.   :   5,206,935
DATED        :   April 27, 1993
INVENTOR(S)  :   Sinks et al.

It is certified that error appears in the above-identified patent and that said Letters Patent is hereby corrected as shown below:

In column 3 at line 5 following "Recall" delete "the" and insert --that--.

In column 3 at line 8 delete "signal" and insert --signals--

Signed and Sealed this

Ninth Day of December, 1997

Attest:

BRUCE LEHMAN

Attesting Officer   Commissioner of Patents and Trademarks